JOHN ASHCROFT.

Improvement in Apparatus for Maturing Raw or Green Coffee.

No. 120,410. Patented Oct. 31, 1871.

Section on Line x-x

Section on Line y-y

Witnesses:

Inventor:
John Ashcroft

AM. PHOTO-LITHOGRAPHIC CO. N.Y. (OSBORNE'S PROCESS.)

UNITED STATES PATENT OFFICE.

JOHN ASHCROFT, OF BROOKLYN, NEW YORK, ASSIGNOR TO SARAH JANE ASHCROFT, OF SAME PLACE.

IMPROVEMENT IN APPARATUS FOR MATURING RAW OR GREEN COFFEE.

Specification forming part of Letters Patent No. 120,410, dated October 31, 1871.

*To all whom it may concern:*

Be it known that I, JOHN ASHCROFT, of Brooklyn, Kings county and State of New York, have invented certain Improvements in an Apparatus for Maturing and Refining the Raw or Green Coffee, being by the direct action of steam upon the berries in bags or bulk, of which the following is a specification:

The nature of my invention consists in an apparatus for coloring, maturing, and refining the green or raw coffee-berry, thereby increasing its commercial and other value.

Figure 1:
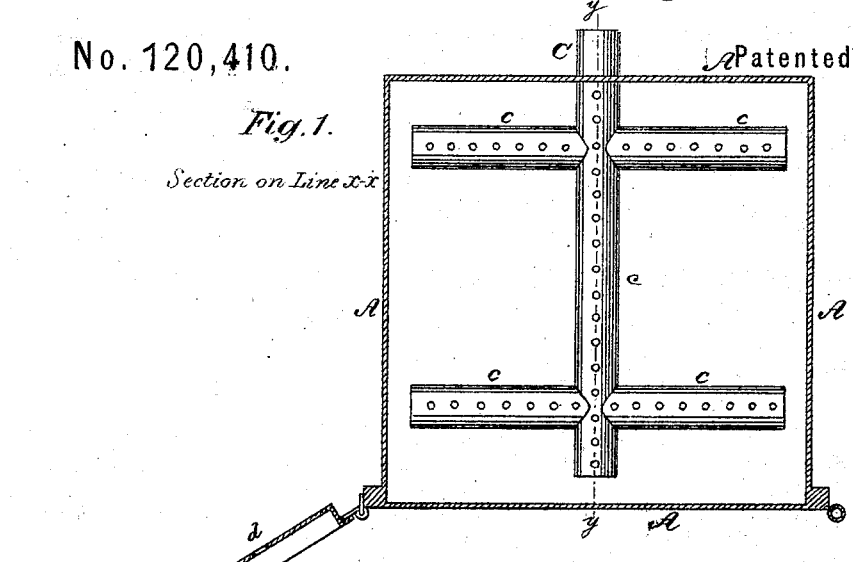
Figure 3:
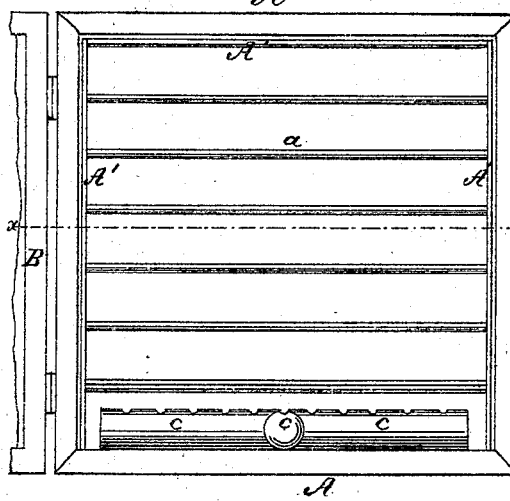

In the drawing, Figure 1 shows a sectional or plan view on line $x\ x$, Fig. 3, illustrating how the steam enters the bottom of my apparatus by $y$, and is disseminated through the pipes $c\ c$ or other equivalent system, not altering the nature of my invention, said pipes being perforated as seen to let the direct steam escape.

My apparatus has six (more or less) sides, A, (which may be round,) making a chamber in which to put coffee in bags or bulk. It may be held by a frame or receptacle having open sides and a perforated bottom for bags or coffee in bulk, as it will assist the dissemination of steam, which is my object. It is true the coffee may be thrown in emptied from the bags, but this will not facilitate the process, and will only add to expense and inconvenience. I prefer having a removable frame-work, A', to take out and put in. It may have a gate in front, and it may have casters or wheels on it by which to lessen labor.

Figure 2:
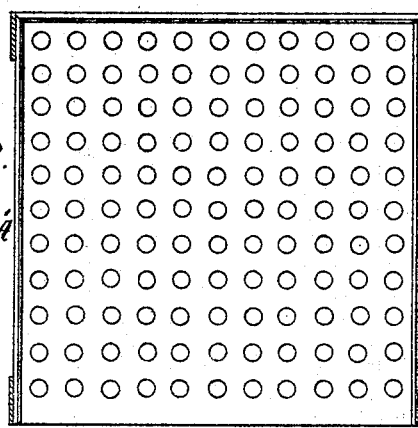
Figure 4:
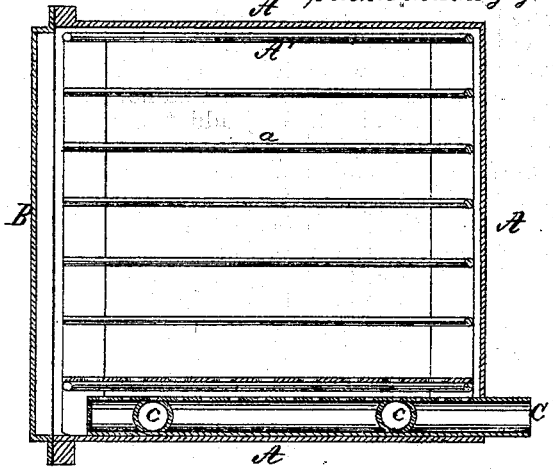

Fig. 2 shows the perforated bottom of my receptacle for coffee-sacks. Fig. 3 shows a section in line $x\ x$, and Fig. 4 one on line $y\ y$, Fig. 1.

This apparatus may be varied without departing from the nature of my invention; its object being to facilitate the maturing and refining of coffee by the direct action of steam. B in the drawing is the door of the receptacle, which preferably should be at the side or end for convenience. It has, or any other side may have, an opening or openings, $d$, at or near the top, preferably, by which the cold air is expelled when the steam is let into the chamber, and such opening or openings should be at the proper time closed to prevent the escape of the aroma after the cold air is expelled and the coffee becomes heated by the action of the steam. The openings $d$ are to permit the escape of the cold air, which would be forced to the top of the chamber on the introduction of steam, and which, if not allowed to escape, would lead to a condensation of steam and prevent radiation.

Having thus described my invention, what I claim as new, and desire to secure by Letters Patent of the United States, is—

1. In an apparatus for maturing coffee, the openings $d\ d$, for the purpose as shown and described.

2. The perforated steam-pipes $y\ c\ c$, or their equivalents, for the purpose as set forth and described.

3. The rack A', as shown and described, and for the purpose set forth.

4. The apparatus for maturing and refining the raw or green coffee-berry, substantially as shown and described.

JOHN ASHCROFT.

Witnesses:
EDM. F. BROWN,
H. V. LEIBIN.

(35)